Sept. 21, 1965

T. O. DAVIDSON ETAL 3,207,238

THERMAL PIERCING CONTROL

Filed Aug. 6, 1962

INVENTORS
WILLIAM P. ATKINSON
TREVOR O. DAVIDSON
BY

ATTORNEY

INVENTORS
WILLIAM P. ATKINSON
TREVOR O. DAVIDSON
BY
ATTORNEY

FIG. 10

United States Patent Office 3,207,238
Patented Sept. 21, 1965

3,207,238
THERMAL PIERCING CONTROL
Trevor O. Davidson, Milwaukee, and William P. Atkinson, South Milwaukee, Wis., assignors to Bucyrus-Erie Company, South Milwaukee, Wis., a corporation of Delaware
Filed Aug. 6, 1962, Ser. No. 215,009
7 Claims. (Cl. 175—14)

This invention relates to apparatus and method for thermally working and drilling a mass of mineral or mineral-like material, and particularly relates to a method and apparatus for controlling the feeding of a piercing device for penetrating said mass.

Thermal piercing of holes in rock or like mineral materials has been described in at least the following United States Patents: 2,675,993, 2,675,994, 2,693,937, and 2,738,162. In general, holes have been sucessfully pierced in masses of minerals and mineral-like materials by applying thereto a flame from a blow pipe to separate material from the mass, removing the separated material from the mass to form a hole, and advancing the blow pipe into successive portions of the hole as it is formed to increase its depth. Some rocks, such as quartzite, have been pierced by a spalling process wherein particles of rock are spalled off without fusion and are blown out in an unfused condition. Others, such as iron ore, have been pierced by a process wherein the ore is melted and then either blown out in the melted condition, or, preferably, quenched with water in the hole, mechanically disintegrated by the physical impact of rotating teeth, and blown from the hole in a solid condition.

During thermal piercing with the blow pipe, conditions may be enecountered which retard the downward positioning of the blow pipe. For example, when an open seam or fissure is reached in the substratum, a necking may result at that portion of the hole which may retard the passage of the blow pipe, and the piercing progress is stalled until the necked portion or collar in the hole is removed. As such retardations in thermal piercing occur below ground level, they are not observable by the operator, and the operator must rely on auxiliary detecting apparatus or "feel" to determine when the thermal piercing has been impeded.

Further, the feed of a blow pipe during thermal piercing should be increased when the mineral-like material pierces more easily so that the piercing is accomplished at an optimum rate.

It is therefore an object of this invention to provide apparatus and method for a thermal piercing machine which senses resistance to penetration of the blow pipe as caused by collars, change of substratum materials and the like and to initiate corrective action.

It is another object of this invention to provide a means for automatically recycling the thermal piercing blow pipe for overcoming collars and the like in the substratum.

It is a further object of this invention to provide a method for detecting resistance to the advance of a blow pipe during the thermal piercing process and to initiate corrective action to overcome same.

It is a further object of this invention to provide a control system for a thermal piercing machine wherein sensed change of weight of a thermal piercing blow pipe initiates a corrective action to allow thermal piercing to continue at an optimum rate.

It is another object of the invention to provide a control system for a thermal piercing machine wherein a sensing means is provided for detecting resistance to the advance of a blow pipe and corrective action is initiated in the blow pipe supporting means for enabling corrective positioning of said blow pipe.

It is another object of the invention to provide blow pipe weight sensitive means for initiating corrective action in a thermal piercing control system for controlling the rate of thermal piercing by the blow pipe.

Other objects and features of novelty will be apparent from the following description and accompanying drawings, in which.

Figures 1, 2, 3, 4:
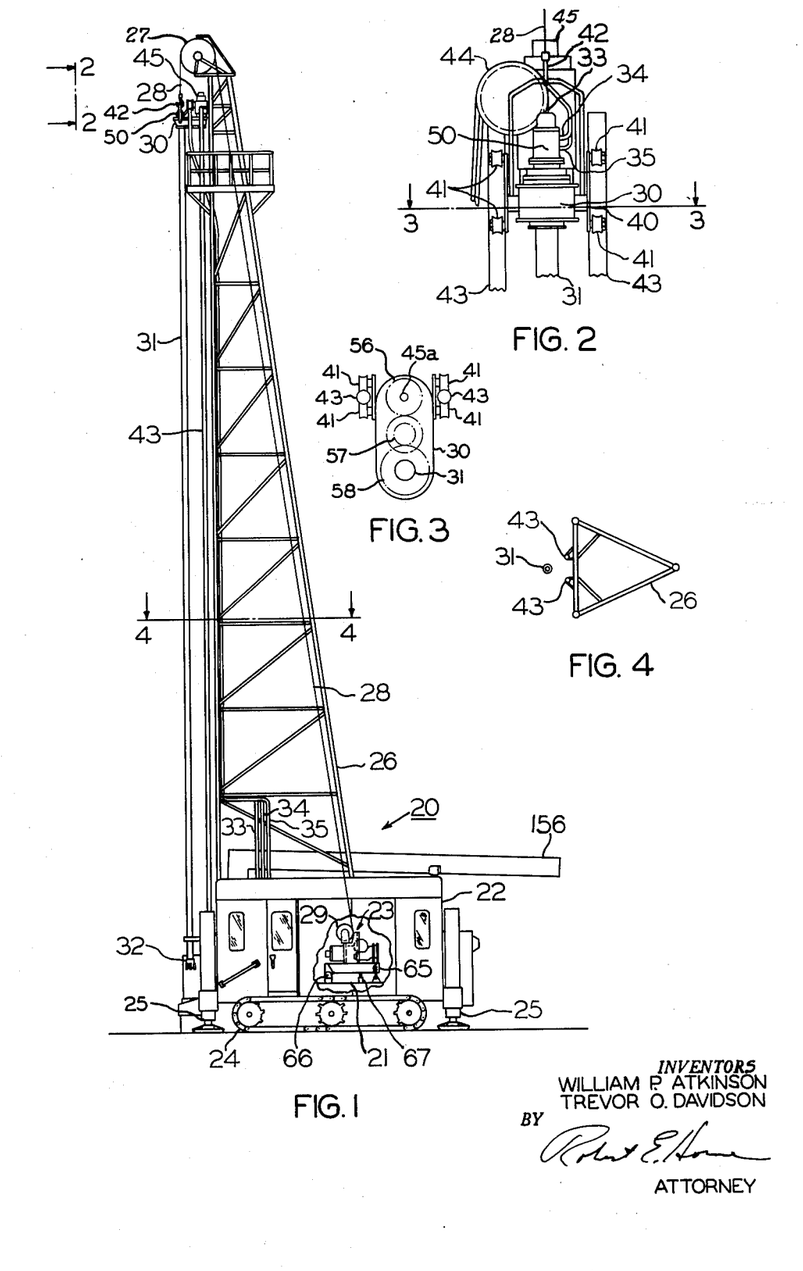
FIGURE 1 is a side elevation of a thermal piercing machine having a blow pipe and control therefor.
FIGURE 2 is an enlarged elevation view taken along 2—2 of FIGURE 1.
FIGURE 3 is a plan view taken at 3—3 of FIGURE 2.
FIGURE 4 is a plan view taken along 4—4 of FIGURE 1.

Referring now to FIGURE 1 wherein a thermal piercing drilling machine, designated generally as 20, is provided with a deck frame 21 to which is secured a cab 22 and hoist machinery 23, and is mounted on crawler units 24 for transport and movement at the drilling location. Additional stability during thermal piercing is provided by hydraulic jacks 25 which are retracted upwardly when it is desired to propel the machine 20.

Also mounted on the frame 21 is a drill mast 26 of triangular construction as shown in FIGURE 4. A hoist sheave 27 is mounted for rotation at the upper portion of the mast 26 over which is reeved a hoist cable 28. The hoist cable 28 is connected at one end to a hoist drum 29 and at its oppoiste end to a rotary drive means 30 to which a blow pipe 31 is rotatably secured.

The blow pipe 31 is provided with a thermal piercing head 32 through which flames and water are discharged for the thermal piercing of rock and other mineral material.

Oxygen, fuel, and water are fed to the blow pipe 31 from supply tanks (not shown) by conduits 33, 34 and 35 respectively. The conduits are flexible and follow the blow pipe 31 as it is positioned upwardly or downwardly by the action of the hoist cable 28 and drum 29 as driven by the hoist machinery.

Reference is made now to FIGURE 2, wherein the rotary drive means 30 is shown mounted on a frame 40 provided with rollers 41 which engage elongated cylindrical support members 43 for ease in positioning the rotary drive means 30 along the vertical extent of mast 26. The flexible conduits 33, 34, and 35 pass over guide sheave 44 to their respective connections on rotary drive means 30. As the rotary drive means 30 and blow pipe 31 are inter connected, the entire weight of the rotary drive means and blow pipe 31 is supported on the hook 42 by the hoist cable 28 reeved over the sheave 27 and running down to the hoist drum 29. When the hoist drum is driven in one direction the blow pipe 31 moves downwardly, and when the drum rotation is reversed the blow pipe 31 is moved upwardly.

Figure 5:
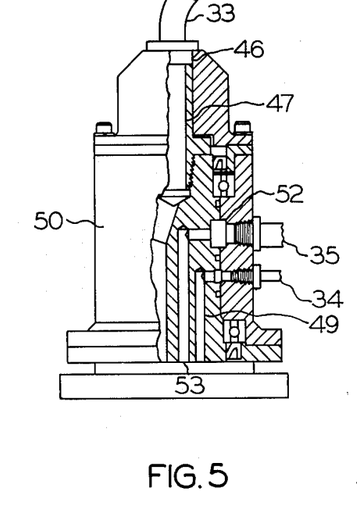
FIGURE 5 is an enlarged elevation in partial section of rotary control valve 50 of FIGURE 1.

In FIGURE 5, the conduits 33, 34, and 35 are shown as connected to a rotary drive head 50. The oxygen conduit 33 connects at a fitting 46 to supply oxygen to conduit 47 which passes through the entire length of the blow pipe 31 until it enters the combustion chamber 48 (see FIGURE 6) to mix with the fuel for combustion supplied through conduit 49 to a fuel injector 51. The water enters at fitting 52 and after flowing through conduit 53 flows around the fuel and oxygen conduits in chamber 53a and discharges through orifices 54 in the blow pipe head 32.

Figure 6:
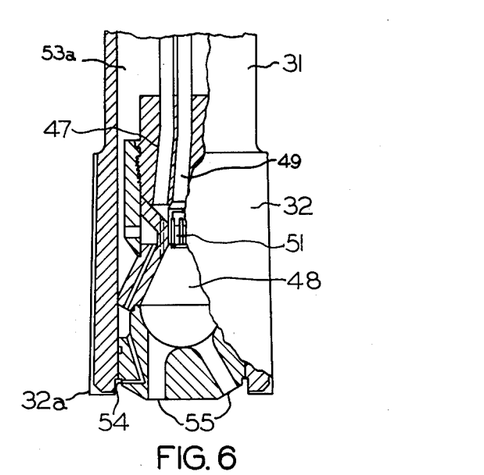
FIGURE 6 is an enlarged elevation in partial section of blow pipe head 32 of FIGURE 1.

The blow pipe 31 and the blow pipe head 32 are rotated by motor 45 through shaft 45a and gears 56, 57, and 58 (see FIGURE 3) of rotary drive means 30 at approximately 15–40 r.p.m. As the blow pipe head 32 enters the material to be thermally pierced, the flames emitting from openings 55 heat the mineral mass to a white heat and the water discharging through openings 54 tends to spall the mineral mass. By the formation of steam and combustion gases the spalled rock is forced upwardly from the hole. The loosened spalled rock, steam, and combustion gases are discharged away from the machine 20 by an exhaust duct 56.

In the preferred embodiment, approximately 10,000 cubic feet of combustion gases are formed during the thermal piercing process and approximately 1,200 gallons of water is used each hour. As the water turns to steam upon contact with the heated mineral mass to be pierced, sufficient force is produced by the combustion gases and expansion of water into steam in the pierced hole to eject the material loosened by piercing from the hole.

On occasion, during the thermal piercing by blow pipe 31, a necked or collar portion will form in the hole. If this cannot be removed by thermal piercing, it is possible to ream away enough of the collar portion by the rotation of the blow pipe 31 and head 32 to allow the blow pipe head 32 to pass by. Such reaming is accomplished by the continued rotation of the blow pipe 31 by rotary drive means 30 and the action of the reamer blades 32a mounted on head 32.

Thus, in general, the thermal piercing of the mineral mass is accomplished by feeding the rotating blow pipe 31 into the mass and continuing to move it downwardly as the mass of mineral is thermally pierced to form a hole having a greater diameter than the blow pipe 31.

Figure 7:
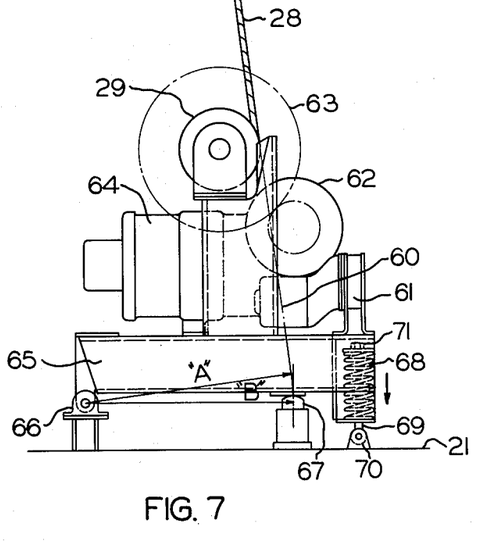
FIGURE 7 is an enlarged elevation of hoisting means 23 of FIGURE 1.

The blow pipe 31 and rotary drive means 30 therefor is supported by hook 42 of cable 28 reeved over sheave 27 and connected to drum 29. Referring now to FIGURE 7, the drum 29 is powered for rotation by low speed hoist motor 60 which drives drum 29 through chain drive 61 and gears 62 and 63. Provision is also made for conventional means (not shown) to drive drum 29 through high speed hoist motor 64. The drum 29 and motors 60 and 64 are mounted on hoist frame 65.

One end of hoist frame 65 is pivotally mounted at pivot block 66 which is secured to deck 21. The other end of frame 65 is free to move in a vertical plane as viewed in the drawings and rests on hydraulic pressure cell 67. A compression spring 68 acts downwardly (as viewed in the drawings) against frame 65. The spring 68 is connected to deck 21 by link 69 pinned to pivot 70. When the entire weight of the blow pipe 31 and rotary drive means 30 acts on cable 28 on one side of sheave 27, the weight of the hoist machinery 23 and frame 65 acts on cable 28 on the other side of sheave 27. A balance of weight is achieved about pivot block 66 by adjusting compression spring 68, as by nut 71, to act on frame 65 until zero weight is exerted by frame 65 on pressure cell 67. Thus, the weight of the blow pipe and rotary drive means is balanced with the weight of the hoist machinery, hoist frame, and the adjusted force of spring 68. This adjustment is normally made before commencing a thermal piercing operation, with the blow pipe 31 in a raised position, as shown in FIG. 1, and cable 28 wound on the drum 29.

In the preferred embodiment, the moment arm "A" of cable 28 acting about pivot block 66 is equal to moment arm "B" of the pressure cell 67 about the same block 66, and they also intersect at the point where the pressure cell 67 contacts the frame 65. For the balanced adjustment of the preceding paragraph the platform 65 and pressure cell 67 engage one another, but there is no appreciable force upon the cell 67. With moment arms "A" and "B" being equal, any change of weight on the blow pipe acting on cable 28 will directly effect the weight acting on cell 67. For example, if the blow pipe weight is reduced, as by the blow pipe being held up by a collar or the like in a hole, the reduction of weight of the blow pipe on cable 28 will cause a net downward force from spring 68 and the weight of the frame 65 plus its apparatus to increase the force effective on pressure cell 67. This force is equal to the reduction of weight of the blow pipe. The pressure cell 67 then produces a fluid pressure signal representative of the weight reduction caused by the "hanging-up" of the blow pipe.

Thus, the pivotal mounting of hoist frame 65 on deck frame 21 provides a fulcrum at pivot block 66 for the combined weight of the hoist machinery and hoist frame. A force acting on cable 28 at drum 29 is substantially equal to the combined weight of the blow pipe 31 and rotary drive means 30. This force tends to pull the hoist machinery and hoist frame upwardly about block 66, and to the extent that the combined weight of the blow pipe and rotary drive means overcomes the weight of hoist frame and the hoist machinery it is necessary to provide a compressive force as by spring 68 to produce a zero force at the position wherein hoist frame 65 contacts pressure cell 67. This condition of balance, or zero force at the pressure cell 67 serves as a point of reference for the control of thermal piercing by the blow pipe 31 as described hereinafter.

For example, the full weight of the blow pipe 31 and rotary drive means 30 acts on cable 28 when the blow pipe hangs freely from hook 42 to move upwardly and downwardly as guided by rollers 41 on cylindrical supports 43. The free hanging condition of the blow pipe will exist when the blow pipe head 32 thermally pierces into a mineral mass subjacent the blow pipe head. The thermal piercing flames emitting from openings 55 of head 32 combined with the water flowing from openings 54 will cause thermal piercing of the mineral mass beneath the head. When, however, the blow pipe head touches or is "hung-up" in a portion of the hole, or the gases in the hole react upward against the head 32, the weight of the blow pipe acting on cable 28 will be reduced. As this reduction in weight is effective at drum 29 the spring 68 and frame 65 provide a net downward force on the pressure cell 67 to produce a fluid pressure signal representative of loss of weight caused by the blow pipe retardation or resistance to penetration in the hole. If the retardation increases beyond a predetermined amount, a corrective action will be instituted by the thermal piercing control system (to be described hereinafter), in response to the change in fluid pressure developed in the pressure cell 67.

Figure 8:
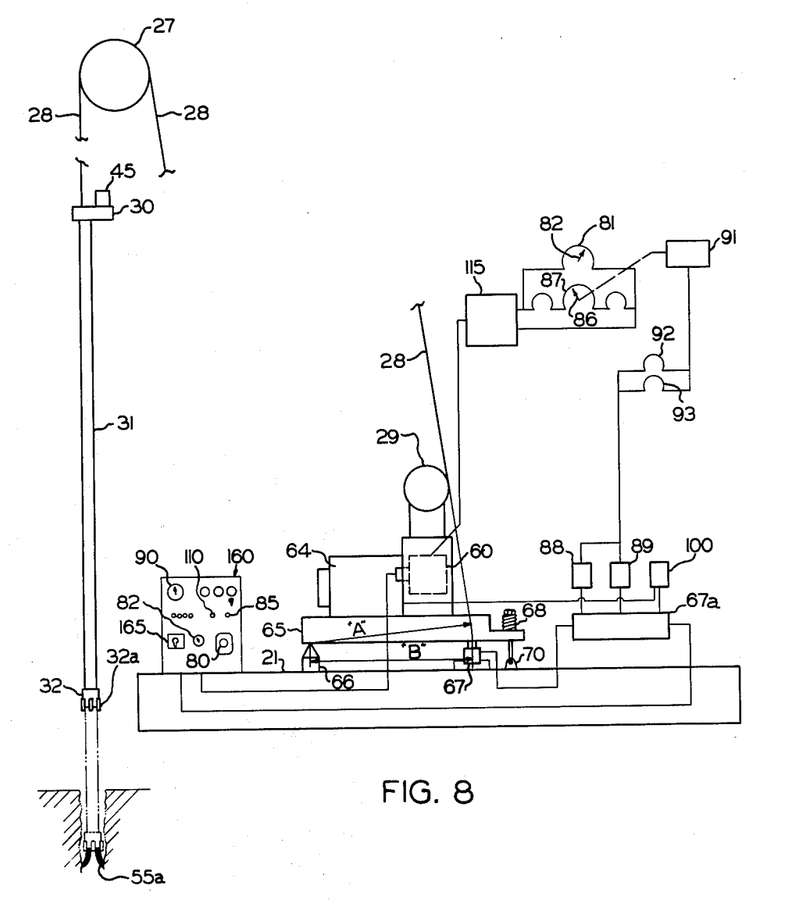
FIGURE 8 is a schematic diagram of the preferred embodiment of the invention.

Reference is now made to FIGURE 8 wherein a schematic diagram of the thermal piercing control system is disclosed in conjunction with the blow pipe 31 and its relation to hoist frame 65 and fluid pressure cell 67. Dotted lines indicate a representative position of the blow pipe head during the thermal piercing of a hole.

In general, the operation of the thermal piercing machine 20 consists of lighting a mixture of fuel and oxygen at openings 55 of blow pipe head 32 to produce piercing flames 55a. Water flow is also initiated through the blow pipe 31. The rotary drive means 30 is actuated through conventional circuitry (not shown) as by switch buttons 170 to rotate the blow pipe at a preselected r.p.m. to cause the flames and water to sweep the hole in circular path. With the blow pipe ignited and rotating, the blow pipe 31 and head 32 is lowered to the ground by paying out cable 28 from drum 29. As the flames from the blow pipe head 32 heat the mineral mass to be pierced to a white heat, the water emitting from head 32 causes a spalling action which disintegrates the mineral mass and causes steam and combustion gases to force the spalled material from the hole where it is discharged away from the machine 30 by exhaust duct 56.

The operation of the thermal piercing machine will be described hereunder in general with reference to FIGURE 8. A more detailed description will be made further hereunder with specific reference to FIGURE 9.

In FIGURE 8, the lowering of the blow pipe 31 is initiated by pushing switch button 80 to energize the low speed hoist motor 60 and manual control potentiometer 81. The various control components are shown schematically in FIGURE 8 and will be described to delineate the blow pipe feed control during thermal piercing.

The operator by positioning arm 82 of potentiometer 81 controls the output of an A.C.–D.C. converter 115, which in turn supplies control current to the D.C. motor 60, and thereby varies the speed of the motor 60. Thus, the operator controls the rate of downward movement of the blow pipe 31 as it pierces through a subjacent mineral mass or the like. The speed of blow pipe descent is increased by increasing the speed of hoist motor 60 to speed the rotation of drum 29. The operator positions potentiometer arm 82 until the thermal piercing proceeds at a maximum rate for the mineral mass to be pierced. Any resistance to penetration by the blow pipe will result in a fluid pressure signal from the pressure cell 67 communicated to pressure header 67a and observable at pressure gauge 90. In other words, the operator increase the downward rate of the blow pipe to an extent wherein the blow pipe maintains its free-hanging position, or, in some instances, an empirical value of resistance to penetration depending on the type of mass being pierced, and continues to pierce at a maximum rate.

If the operator attempts to increase the blow pipe feed rate faster than the flames are able to pierce ahead of the blow pipe, the blow pipe will tend to be partially supported in the hole thereby decelerating the downward movement of the blow pipe and increasing the resistance to penetration. The load on cable 28 will be decreased to cause spring 68 and frame 65 to press against cell 67 an increased amount dependent upon the extent that the weight was relieved by the blow pipe in the partially supported retarded condition. The force acting on cell 67 then produces a different fluid pressure which is readable as "resistance to penetration" on gauge 90. When the operator notes the increased "resistance to penetration" on gauge 90, he positions arm 82 to reduce the speed of motor 60 and consequently the rate of downward movement of the blow pipe.

The blow pipe thermal piercing operation can also be operated automatically by pressing switch button 85, which removes the potentiometer 81 from the circuit and inserts a second potentiometer 87 having an adjustable arm 86 driven by a reversible motor 91. The automatic feed control energized by button 85 will cause arm 86 of potentiometer 87 to be positioned in accordance with the fluid pressure from pressure cell 67 acting on pressure switches 88 and 89, as will now be described in detail. When switch button 85 is depressed, a circuit is completed through pressure switch 88 and potentiometer control motor 91 which drives potentiometer arm 86 to control the amount of direct current to the field of the low speed hoist motor 60. The potentiometer arm 86 is therefore being continuously shifted in position, to continually increase the speed of motor 60, wherefore the blow pipe 31 is being accelerated downwardly. If there should now be a resistance to penetration of the blow pipe 31, that relieves the cable 28 of part of the weight of the pipe 31 whereby a corresponding force is applied to the cell 67, and the pressure developed in the cell 67 increases to a predetermined level, then the pressure switch 88 is opened. This opens the circuit of the potentiometer control motor 91, and movement of the potentiometer arm 86 is halted. The speed of the motor 60 now becomes constant and the blow pipe 31 is lowered at a constant velocity, instead of at an increasing rate of speed.

If the resistance to penetration continues to increase as represented by an increased fluid pressure in pressure header 67a and the fluid pressure exceeds a predetermined amount, pressure switch 89 will close to drive potentiometer control motor 91 in the reverse direction to decelerate the piercing rate of the blow pipe. The deceleration will continue until the resistance to penetration is reduced and the pressure developed in cell 67 falls to the point where pressure switch 89 opens. If the resistance to penetration further decreases, the pressure from the cell 67 will correspondingly decrease and pressure switch 88 is caused to close, thereby causing the blow pipe to accelerate downwardly again.

In general, the piercing rate will vary when piercing in various mineral masses. In the preferred embodiment, the rate of piercing may be set to vary from 1 inch per minute to 15 inches per minute. The rate of acceleration or deceleration is changed by positioning potentiometers 92 and 93 respectively. Also, it should be understood that pressure switches 88 and 89 may be actuated at predetermined pressures within predetermined ranges of pressures. For example, pressure switch 88 may be set to open at 300 p.s.i. and pressure switch 89 may be set to close at 500 p.s.i. The control system seeks to maintain the piercing rate at an optimum rate for the substratum being pierced. Thus, the rate may be established when the resistance to penetration of the blow pipe is at 400 p.s.i.—in other words, at a condition where both switches 88 and 89 are open. Or the optimum piercing rate may be at 200 p.s.i. wherein the switch 88 is closed. Or the optimum rate may be difficult to establish as the substratum varies. In such event, the resistance to penetration will vary continually and the fluid pressure signal from cell 67 will control the low speed hoist motor 60 to accelerate, run at constant speed, or decelerate in accordance with the signal so that the thermal piercing rate will change with the variation of substratum.

When operating the thermal piercing machine manually by positioning arm 82, or when operating on automatic feed control with motor 91 positioning arm 86, it is possible for the blow pipe to "hang-up" on a collar or necked portion of the pierced hole. When "hanging-up" of the pipe occurs, substantially all of the weight of the blow pipe is removed from cable 28, and, as a consequence, the spring 68 and frame 65 exert a greater downward force resulting in an increased fluid pressure signal from pressure cell 67. When the increased fluid pressure signal reaches a predetermined p.s.i., pressure switch 100 is actuated to close.

The action of closing pressure switch 100 results in a deenergization of the low speed hoist motor 60 and an energization of the high speed hoist motor 64. Upon energization of motor 64, the blow pipe 31 will be positioned rapidly upwardly in the hole to a predetermined point. At that predetermined point, the high speed motor 64 will be deenergized and the blow pipe will be allowed to rotate in position for a predetermined period before the low speed motor moves it downwardly again. As the blow pipe 31 is moved downwardly, the flames emitting from the head 32 heat the collar again in another attempt to disintegrate it. If the collar is disintegrated, the automatic feed continues as described hereinabove; however, if the collar remains, the resistance to penetration and resulting increased fluid pressure will again initiate a retract cycle to withdraw the blow pipe 31 from the collar to a position from which it will again attempt to pierce past the collar. This retract cycle can be repeated indefinitely.

Figure 9:
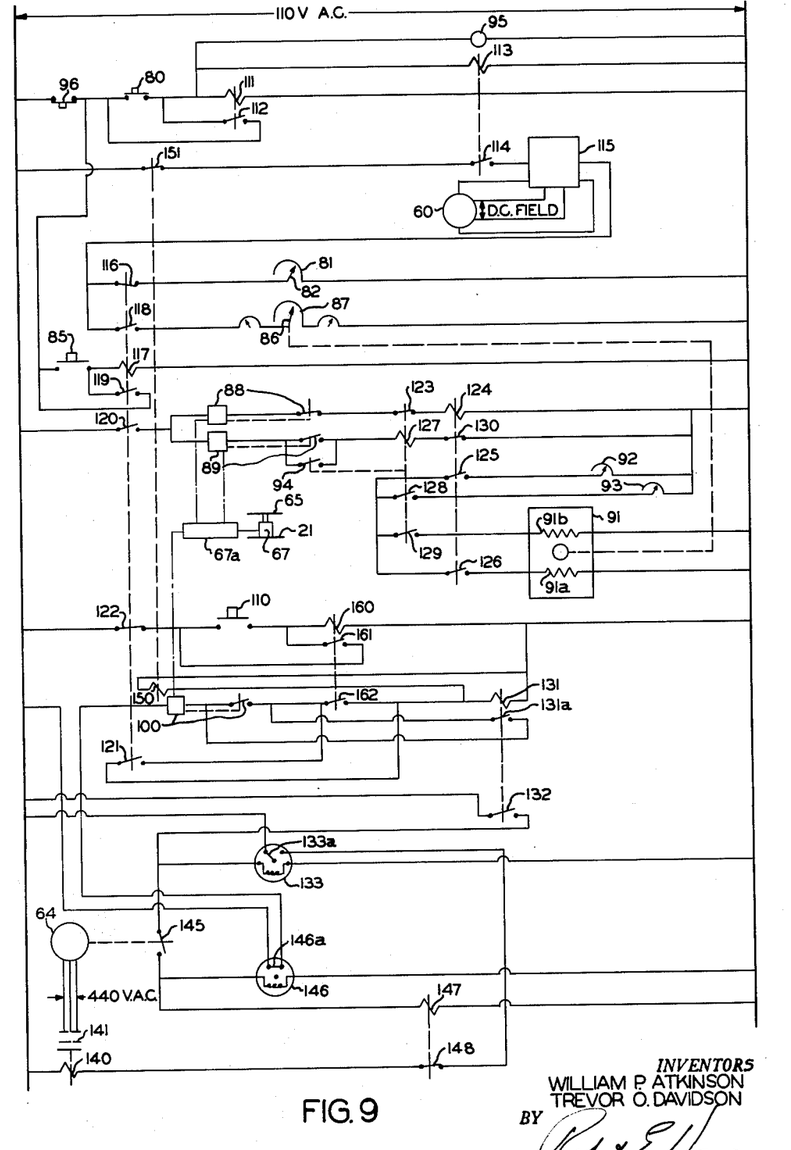
FIGURE 9 is a schematic circuit diagram of the preferred embodiment of the invention.

Referring now to FIGURE 9, a thermal piercing control circuit is disclosed as connected across a source of A.C. voltage. To energize low speed hoist motor 60, switch button 80 is closed to energize holding relay 111 to close switch 112. At the same time a relay 113 is energized to close switch 114. In this manner, A.C.-D.C. convertor unit 115 is energized to produce direct current for operating motor 60. As switch 116 is normally closed, the voltage across unit 115 is varied by positioning arm 82 of potentiometer 81. The variation in A.C. voltage produces a variation in direct current to the field of motor 60 thereby varying the speed of the motor. Arm 82 is manually positioned to vary the speed of motor 60 and constitutes a manual control for hoist motor 60 which drives drum 29 to move the blow pipe 31 and head 32 at a rate dependent upon the speed of drum 29.

To control the thermal piercing of blow pipe 31 automatically, a switch button 85 is closed to energize relay 117 to open switch 116 thereby deenergizing the potentiometer 81 of the manual control circuit. Energization of relay 117 also closes holding switch 119, switch 118, switch 120, and switch 121. Switch 122 is opened by relay 117 to render switch button 110 ineffective.

With switches 118 and 120 closed by the energization of relay 117, the low speed motor 60 speed is controlled by the positioning of arm 86 of potentiometer 87 by the potentiometer control motor 91.

Motor 91 is energized through closed switch 120, normally closed pressure switch 88, normally closed switch 123, and switches 125, 126 closed by relay 124, relay 24 being energized when pressure switch 88 is closed. The current flows through winding 91a of motor 91 to drive the motor 91 to advance the potentiometer arm 86 to accelerate the low speed hoist motor 60 which in turn accelerates the rotation of drum 29 which lowers the blow pipe 31 downwardly from sheave 27.

In the preferred embodiment, pressure switch 88 is set to open at a predetermined fluid pressure from pressure cell 67—a pressure representative of weight reduction of the blow pipe as penetration of the blow pipe is resisted in the pierced hole. Such resistance to penetration, as set out hereinabove, could be caused by accelerating the blow pipe to too great a downward velocity or the blow pipe could be restricted by a collar in the hole or the like. Regardless of the cause of the resistance to penetration of the blow pipe, switch 88 will open at a predetermined pressure and arm 86 will be maintained in the position established immediately prior to the opening of pressure switch 88. Thus, the blow pipe 31 will tend to feed downwardly at the rate established by the position of arm 86. If the resistance of penetration of the blow pipe continues, the pressure signal from pressure cell 67 will increase until it reaches a predetermined pressure of sufficient magnitude to close pressure switch 89.

When switch 89 closes, relay 127 is energized through normally closed contacts 130 of switch 123, and close switches 129 and 128. As relay 124 was deenergized by the opening of switch 123, switches 125 and 126 are opened. Therefore, winding 91b of motor 91 is energized, which winding causes the motor 91 to run in the reverse direction from that when winding 91a was energized, to decelerate low speed motor 60 through the repositioning of arm 86 of potentiometer 87.

The deceleration of motor 60 thus slows the down-feed rate of blow pipe 31. If the slower feed rate results in a lesser resistance to penetration, the pressure may be such as to cause pressure switch 89 to open and thereby open switch 129 by the deenergization of relay 127. The motor 91 is now deenergized and the speed of motor 60 is constant. If the resistance to penetration further decreases the pressure signal from the cell 67 may decrease to the point where pressure switch 88 is reclosed. The motor 91 is then energized through winding 91a to advance arm 86 to accelerate motor 60.

In the above manner, the rate of thermal piercing is controlled by the fluid pressure signal from pressure cell 67. In the preferred embodiment, pressure switch 88 is normally closed until the fluid pressure from cell 67 exceeds 300 p.s.i. Pressure switch 89 will not close until the fluid pressure signal is in excess of a predetermined amount, for example, 500 p.s.i. When the fluid pressure signal from cell 67 is between predetermined amounts, for example, 300 p.s.i. and 500 p.s.i., the arm 86 remains in the position that it was placed just prior to the pressure exceeding a predetermined amount, for example, 300 p.s.i.

In the event that the resistance to penetration continues to increase, indicating that a collar or other obstruction has formed in the hole, more force will be applied on pressure cell 67 and if such weight is exerted to result in a fluid pressure of over a predetermined amount, for example, 1100 p.s.i. pressure switch 100 will close to initiate the automatic retract cycle for the blow pipe 31.

When switch 100 closes, relay 131 is energized through closed switch 121 and switch 132 is closed thereby starting timer 133. After timer 133 has been energized for a predetermined period of time (i.e., 2 seconds) switch 133a will close and relay 140, energized through normally closed contacts 148, will close the starting contacts 141 of high speed hoist motor 64. It should also be noted that simultaneous with the energization of relay 131, relay 150 was also energized to open switch 151 to deenergize the low speed hoist motor 60. Thus, when pressure switch 100 closes, the low speed hoist motor 60 is deenergized, and the high speed motor 64 is energized after the predetermined period established by timer 133.

The high speed motor 64 drives drum 29 to pay in cable 28 at an accelerated rate to raise blow pipe 31 a predetermined distance. The accelerated raising of blow pipe 31 continues until switch 145 is closed by a linkage means actuated by the rotation of motor 64.

When switch 145 is closed by the action of motor 64, timer 146 is energized and simultaneously relay 147 is energized to open switch 148 to deenergize relay 140 to open motor contacts 141 to deenergize motor 64. After a predetermined period of time (i.e., 9 seconds), switch 146a of timer 146 opens to deenergize relay 150 to close switch 151 and thereby energize low speed hoist motor 60. If the fluid pressure from pressure cell 67 remains over the predetermined amount, for example, 1100 p.s.i., switch 100 will close and the blow pipe will again be retracted by the high speed motor 64. The recycling can be repeated until the collar is removed.

It should also be noted that the operator might desire to use the automatic retract cycle while operating manually as by arm 82 of potentiometer 81, and in this event, it is necessary to depress button 110, to energize relay 160 to close switch 161 and switch 162. In the event that pressure switch 100 is already closed or closed subsequent to the closure of button 110, relays 130 and 150 are energized to close switch 131 and open switch 151 respectively and the operation of the timers 132 and 146 and high speed motor 64 are as described hereinabove.

To deenergize the low speed hoist motor 60 and discontinue piercing operations at the completion of a hole, switch button 96 is depressed, thereby deenergizing coils 111 and 113 and opening holding switch 112 and switch 114 which deenergizes the A.C.-D.C. converter 115 and consequently the low speed motor 60. Coil 117 is deenergized thereby opening switches 118, 119, 120, 121 and 122 and closing switch 116. The entire low speed feed circuit, manual control circuit, automatic control circuit and automatic retract circuit is then deenergized.

Figure 10:
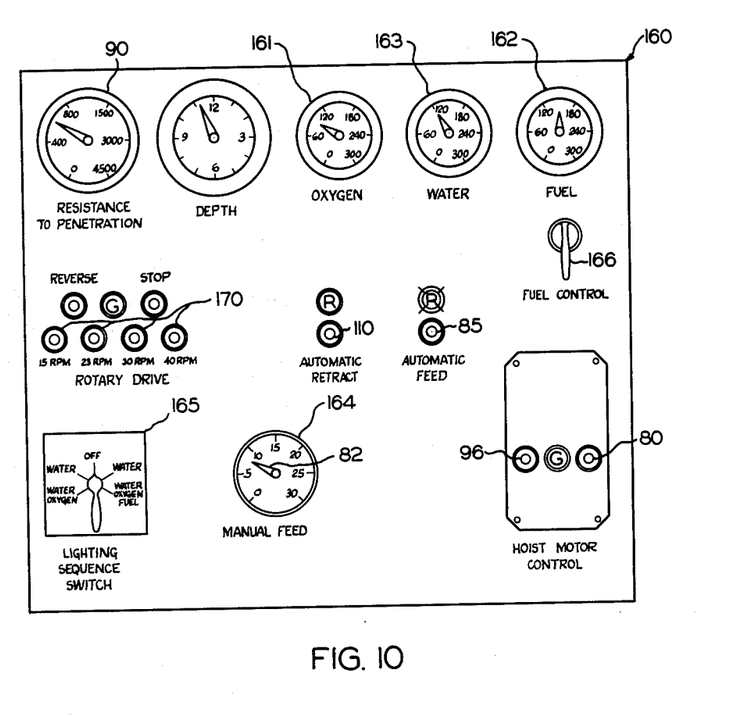
FIGURE 10 is an enlarged schematic diagram of the control panel of FIGURE 8.

Referring now to FIGURE 10 wherein a control panel 160 is disclosed and includes the switch buttons and operating indicia for carrying out thermal piercing by the blow pipe, either manually or automatically. Pressure gauges 161, 162, 163 for oxygen, fuel, and water are provided respectively. The arm 82 is shown mounted on a dial 164 for indicating the piercing rate of the blow pipe. Additionally, the switch buttons for initiating the various circuits described in conjunction with FIGURE 9 are shown having the same number designation. Also, it is noted that the rotary drive motor 45 can be reversed and driven at the designated r.p.m.'s as by switch buttons 170. A lighting sequence switch 165 and fuel control 166 are also shown. All these controls are within easy reach of the operator within cab 22 of the machine 20 of FIGURE 1.

Thus a control system has been described wherein the weight of a thermal piercing means is balanced with the weight of the hoisting means for raising and lowering said thermal piercing means, and an additional force is added to the hoisting means to produce a force on a sensing means which produces a control signal for controlling the rate of thermal piercing by said thermal piercing means. Further, the weight reduction of the thermal piercing means as caused by "hanging-up", or other resistance to penetration of the thermal piercing means or by wear of the thermal piercing means is compensated. In the former, the additional force and the weight of the hoisting means produces a control signal at the sensing means representative of the weight reduction to control the thermal piercing rate, and, in the latter instance, the additional force is adjustably added to the hoisting means to establish a new zero control impulse for a worn thermal piercing means.

It is advantageous to have equal moments about the hoist frame pivot block 66 insofar as the hoist cable and sensing means are concerned. This allows a direct relationship to exist between the actual weight reduction of the thermal piercing means and the control signal which initiates control of the thermal piercing means. Further, such balance between the thermal piercing means and the hoisting means as accomplished with an additional force results in little or no movement of the hoisting frame about the pivot block.

Having now described and illustrated a preferred embodiment of the invention, it is to be understood that the invention is not to be limited to the specific form or arrangement of parts herein shown and described or specifically covered by the claims.

What is claimed is:

1. A method for developing a hole in a substance by thermal piercing comprising: suspending a thermal piercing head; advancing the thermal piercing head into the substance and sensing the amount of resistance to penetration of the head as it produces a hole and remains suspended from the bottom of the hole; increasing the rate of advancement, as penetration is taking place, as long as the resistance to penetration is below a preselected amount; discontinuing the increase in rate of advancement, as penetration is taking place, upon resistance to penetration increasing to said preselected first amount; decelerating the rate of advancement, as penetration is taking place, upon resistance to penetration increasing to a preselected second amount; discontinuing said deceleration of the rate of advancement, as penetration is taking place, upon the resistance to penetration decreasing to a preselected amount; and reinitiating an increasing rate of advancement, as penetration is taking place, upon the resistance to penetration falling below a further preselected amount.

2. A method as in claim 1, in which an amount of resistance to penetration greater than said second amount is preselected and sensed, and upon sensing such amount of resistance to penetration the piercing head is retracted, retained in retracted position for a set time, and then returned to its advancing movement.

3. A method for developing a hole by thermal piercing comprising: lowering a thermal piercing head and sensing the degree of resistance to the continued descent of the head in a hole it is developing while retaining the head above the bottom of the hole; increasing the rate of descent of the thermal piercing head, while retaining the head above the bottom of the hole, as long as the degree of resistance is below a preselected amount; and decreasing the rate of descent of the thermal piercing head, while retaining the head above the bottom of the hole, when the degree of resistance is above a preselected amount.

4. In a thermal piercing machine having a thermal piercing head for creating a hole in rock; means for advancing said head and suspending it above the bottom of a hole being created; and a variable speed hoist motor for said means, the combination of: continuously reading load sensing means engaged with said means for advancing said head that measures resistance to penetration of said head in the hole it creates while the head is spaced from the end of the hole; a variable resistance for varying the speed of said drive motor; a reversible control motor in driving relation to said variable resistance; a first switch connected between said load sensing means and said reversible control motor to run said control motor in a direction that alters said variable resistance to increase the speed of said hoist motor, said first switch being continuously responsive to said load sensing means to operate said control motor as penetration is taking place and the resistance to penetration is below a selected amount; a second switch connected between said load sensing means and said reversible control motor to run said control motor in the opposite direction to decrease the speed of said hoist motor, said second switch being continuously responsive to said load sensing means to operate said control motor as penetration is taking place and while the resistance to penetration is above a selected amount; said latter selected amount being greater than the first selected amount.

5. In a thermal piercing machine having a thermal piercing head, a cable for lowering and supporting said head, and a hoist motor for paying out said cable, the combination of: a load sensing device that continuously measures the tension of said cable to indicate the resistance to penetration of the piercing head while the head is supported above the bottom of a hole being created by the head; first switch contacts operated by said load sensing device at a first selected degree of resistance; second switch contacts operated by said sensing device at a greater degree of resistance; a speed control, with a variable adjustment, connected to said hoist motor that accelerates and decelerates the same; said first switch contacts joined with said adjustment of said speed control for continued acceleration of said hoist motor when the resistance is below said first selected degree; and said second switch contacts joined with said adjustment of said speed control for continued deceleration of said hoist motor when the resistance is in excess of said greater degree of resistance.

6. In a thermal piercing machine having a thermal piercing head for creating a hole in rock and the like; a mechanism for advancing the head into a hole being created; and a variable speed motor for said mechanism, the combination of: a motor speed control circuit joined to the motor including variable means for accelerating and decelerating said motor; a continuously acting load sensing element connected with said mechanism that measures the force imposed by the thermal piercing head upon the mechanism to indicate the degree of the resistance to penetration of said head while said head is advanced in a hole during normal thermal piercing in which it is spaced from the end of the hole, control signal means responsively connected with said load sensing element which provide one signal when resistance to penetration is below a preselected value and a different signal when resistance to penetration is above a preselected value; and a control element connected to the variable means of said motor speed control circuit and to said control signals means which varies said variable means, during the normal course of creating the hole while the thermal piercing head is spaced from the end of the hole, in response to indications of resistance to penetration and thereby accelerates and decelerates said variable speed motor as advancement of the head continues.

7. In a thermal piercing machine having a thermal piercing head for creating a hole in a rock; a support cable for advancing said head; and a variable speed hoist motor for said cable, the combination of: a fluid cell that develops pessure in response to tension of said cable measure resistance to penetration of said head in the hole it creates; a variable resistance for varying the speed of said drive motor; a reversible control motor in driving relation to said variable resistance; a first pressure switch joined with said fluid cell operated at a selected value of pressure for energizing said reversible motor to run in a direction that alters said variable resistance to increase the speed of said hoist motor, said first switch being responsive to said fluid cell when the resistance to penetration is below a selected amount; a second pressure switch joined with said fluid cell that operates at a larger value of pressure for energizing said reversible motor to run in the opposite direction to decrease the speed of said hoist motor, said second switch being responsive to said fluid cell when the resistance to penetration is above a selected amount; said latter selected amount being greater than the first selected amount.

References Cited by the Examiner

UNITED STATES PATENTS

| | | | |
|---|---|---|---|
| 1,913,752 | 6/33 | Goldman | 173—6 |
| 1,919,611 | 7/33 | Besigk | 173—6 |
| 2,679,381 | 5/54 | Royer et al. | 175—14 |
| 2,742,555 | 4/56 | Murray | 175—16 |
| 2,935,303 | 5/60 | Royer et al. | 175—14 |
| 2,945,677 | 7/60 | Kammerer et al. | 175—203 |

OTHER REFERENCES

"Production Jet Piercing of Blastholes in Magnetic Taconite," Mining Engineering, 3:585, July 1951.

"Jet Piercing Blast Holes in Granite," Rock Products, April 1953.

CHARLES E. O'CONNELL, *Primary Examiner.*

BENJAMIN HERSH, *Examiner.*